US009120652B2

United States Patent
Munk-Hansen (10) Patent No.: US 9,120,652 B2
(45) Date of Patent: Sep. 1, 2015

(54) SERVICE CRANE FOR A WIND TURBINE (75) Inventor: Thorkil Munk-Hansen, Give (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 683 days.

(21) Appl. No.: 13/462,848

(22) Filed: May 3, 2012

(65) Prior Publication Data

US 2012/0282099 A1 Nov. 8, 2012

(30) Foreign Application Priority Data

May 5, 2011 (EP) .................................... 11164952

(51) Int. Cl.
F03D 11/00 (2006.01)
B66C 23/18 (2006.01)
F03D 1/00 (2006.01)

(52) U.S. Cl.
CPC ............... *B66C 23/18* (2013.01); *F03D 1/001* (2013.01); *F03D 1/003* (2013.01); *F05B 2240/916* (2013.01); *Y02E 10/726* (2013.01); *Y02E 10/728* (2013.01)

(58) Field of Classification Search
CPC .... F03D 1/001; F03D 1/003; F05B 2240/916
See application file for complete search history.

(56) References Cited

U.S. PATENT DOCUMENTS

| | | | |
|---|---|---|---|
| 3,952,836 A | | 4/1976 | Thoma |
| 4,266,911 A | * | 5/1981 | Helm et al. ..................... 416/9 |
| 4,311,434 A | * | 1/1982 | Abe ............................. 416/142 |
| 6,652,221 B1 | * | 11/2003 | Praenkel ..................... 415/3.1 |
| 7,442,009 B2 | * | 10/2008 | Arel ............................ 416/142 |
| 7,895,744 B2 | * | 3/2011 | Numajiri ..................... 29/889.1 |
| 2006/0151767 A1 | | 7/2006 | Wobben |
| 2007/0273154 A1 | * | 11/2007 | Pedersen ....................... 290/44 |
| 2009/0267038 A1 | * | 10/2009 | Teichert et al. .............. 254/335 |
| 2010/0101086 A1 | * | 4/2010 | Amram ...................... 29/889.1 |
| 2010/0254813 A1 | * | 10/2010 | Dawson et al. ........... 416/146 R |

FOREIGN PATENT DOCUMENTS

| | | |
|---|---|---|
| EP | 1677006 A2 | 7/2006 |
| EP | 2147885 A1 | 1/2010 |
| WO | WO 2009132671 A2 | 11/2009 |
| WO | WO 2009132671 A3 | 2/2010 |
| WO | WO 2010037392 A2 | 4/2010 |

OTHER PUBLICATIONS

Communication From European Patent Office, Sep. 20, 2011, pp. 1-7.

* cited by examiner

*Primary Examiner* — Igor Kershteyn

(57) ABSTRACT

A service crane for a wind turbine is provided. The wind turbine includes a tower and a nacelle mounted to the top of the tower. The service crane is mounted to the nacelle and includes a boom, a hoist rope guided along the boom and a winch capable of reeling in and out the hoist rope for lifting or lowering a load. Furthermore, a nacelle is provided which includes a service crane mounted thereto.

16 Claims, 4 Drawing Sheets

SERVICE CRANE FOR A WIND TURBINE

CROSS REFERENCE TO RELATED APPLICATIONS

This application claims priority of European Patent Office application No. 11164952.1 EP filed May 5, 2011. All of the applications are incorporated by reference herein in their entirety.

FIELD OF INVENTION

The invention relates to a service crane for a wind turbine and to a nacelle comprising such service crane.

BACKGROUND OF THE INVENTION

Wind turbines are now frequently being installed as an alternative to conventional power plants that use for example fossil fuels for energy production. Onshore or offshore wind parks may include a number of wind turbines each capable of producing electric power from one to several megawatt. Wind turbines may thus make a substantial contribution to electric power generation. A wind turbine generally comprises a tower on the top of which nacelle is rotatably mounted. A yaw drive may be provided for directing the wind turbine into the wind. It further comprises a rotor including a hub to which one or several rotor blades are mounted, e.g. 3, a generator generating electric energy upon rotation of the rotor and a transformer for transforming the generated electric energy such that it may be fed into the power grid. The wind turbine may of course comprise further components, such as a gear box, inverters, control electronics and the like.

For conversion of wind energy into electrical energy, the moving air rotates the hub via the aerodynamic effect of the rotor blade, the hub turning a rotor of the generator directly or via a gear box. The electrical energy is converted to fit the conditions on the power grid by means of the transformer and a converter unit.

The nacelle of the wind turbine thus comprises several components that may require servicing after a certain period of operation. During service and in the case of a repair, spare parts have to be handled. As most parts are too heavy to be lifted by hand, cranes and lifting devices are used.

For lifting spare parts or tools from the base of the wind turbine tower (e.g. from a base platform, the ground or a vessel/vehicle carrying the parts) up to the nacelle, it is known to mount a crane on top of the nacelle that may perform a lifting operation. Weather conditions, such as strong winds may prevent the operation of such cranes as the load may start to swing. This is a particular problem for offshore wind turbines, where strong winds are often present. By waiting for suitable weather conditions, the servicing of the wind turbine may be delayed, resulting in a prolonged down time of the wind turbine and thus increased expenses or loss of revenue. Also, the crane first has to be brought up to the nacelle and mounted thereto, which is time and labor intensive.

Some nacelles may comprise a platform on which equipment, such as spare parts, may be landed by means of an helicopter (helihoist platform). An external crane may be used for lifting equipment from the helihoist platform into the nacelle.

The equipment, in particular spare parts may need to be positioned inside the nacelle, for which an additional crane is required that transports each part to the location where it is to be mounted. Several cranes and several lifting steps are thus needed.

SUMMARY

It is thus desirable to facilitate the transportation of spare parts, tools and other equipment to the nacelle of the wind turbine. In particular, it is desirable to make the transportation of such equipment more effective and to more independent from prevailing weather conditions.

Accordingly, there is a need to obviate at least some of the drawbacks mentioned above and to provide an improved crane for a wind turbine.

This need is met by the features of the independent claims The dependent claims describe embodiments of the invention.

An embodiment provides a service crane for a wind turbine, the wind turbine comprising a tower and a nacelle mounted to the top of the tower, wherein the service crane is mounted to the nacelle. The service crane comprises a boom, a hoist rope guided along the boom and a winch capable of reeling in and out the hoist rope for lifting or lowering a load. The service crane is arranged and/or configured such that it is capable of lifting a load from a position inside the tower of the wind turbine to the nacelle.

The service crane may thus be used to lift a load, such as spare parts or tools, from a position inside the tower, e.g. from a deck level inside the tower or from a base of the tower. By lifting the load inside the tower, the hoist rope and the load are protected from outside weather conditions, so that a lifting operation may be performed even in bad or heavy weather, e.g. when strong winds are present. As the service crane comprises a boom, it may position the lifted load at a desired location inside the nacelle. Furthermore, the necessity of mounting an external crane to the nacelle before performing a servicing operation may be avoided.

In an embodiment, the service crane is further arranged and/or configured such that it is capable of reaching outside the nacelle and of lifting a load from a position adjacent to a base of the tower to the nacelle. For example in good weather conditions, the load may thus simply be positioned outside the tower of the wind turbine, from which it may be lifted into the nacelle by means of the service crane. Making use of the boom, the crane may then be able to position the load at a desired location inside the nacelle.

The nacelle may for example comprise at least one hatch to the outside, wherein the service crane may be arranged and/or adapted such that its boom is capable of reaching through the hatch to the outside of the nacelle. A hatch may for example be provided at the rear of the nacelle, at one of the sides of the nacelle, at the bottom of the nacelle or at the top of the nacelle, or more than one hatch may be provided at a combination of these locations.

With only one crane, loads may thus be lifted inside and outside the tower of the wind turbine.

The boom of the crane may be adapted to reach out far enough so that the load may be lifted from a position adjacent to the base of the tower. The tower may for example be a conical tower the diameter of which increases from its top towards its base. The boom may reach out far enough so that when the hoist rope is extended down to a base platform of the tower or to the ground, the extended end of the hoist rope is spaced apart from the tower so as to enable the lifting of a load from a position on the base platform or the ground. Certainly, the load may also be lifted from a vessel or vehicle positioned adjacent to the base of the tower.

In an embodiment, the nacelle comprises a helihoist platform and the service crane may be arranged and/or configured such that it is capable of reaching outside the nacelle and of lifting a load from the helihoist platform to the inside of the nacelle. Only one crane may thus be required for lifting loads from inside the tower and from the helihoist platform. Again, the load lifted from the helihoist platform may be positioned at a desired location inside the nacelle by making use of the boom of the crane.

The nacelle may comprise a hatch at the upper side of the nacelle, and the service crane may be arranged and/or adapted such that its boom is capable of reaching through the hedge to the outside of the nacelle and over the helihoist platform. Access of the crane to the helihoist platform may thus be facilitated.

In some embodiments, the crane may be arranged and/or configured to lift a load from a position inside the tower, to lift a load from a position adjacent to a base of the tower and to lift a load from the helihoist platform to the inside of the nacelle. Only one service crane may thus be provided for performing all three different types of lifting operations. A single service crane may thus be sufficient to perform lifting operations for different service situations and different weather conditions. As an example, a spare part may be transported in good weather conditions to an offshore wind turbine and may be stored in the base of the tower of the wind turbine. When service is required, service technicians and their tools may be landed on the helihoist platform, and the service crane may then be used to lift the spare parts up from the inside of the tower to the nacelle and the tools from the helihoist platform to the inside of the nacelle. This may be performed even in bad weather conditions, as when lifting inside the tower, the hoist rope is protected from winds, and when lifting from the helihoist platform, the hoist rope only needs to be extended a short length. Only one lifting operation may need to be performed for transporting each type of equipment, and the service technicians do not need to install an external crane.

The service crane may be mounted inside the nacelle. In an embodiment, the service crane is mounted to a bed frame of the nacelle. The bed frame may provide a strong support for the service crane so that the service crane may lift even heavier loads.

The service crane may have a retracted position in which the service crane is completely comprised inside a canopy of the nacelle. The service crane may thus be protected from weather and spray, and it does furthermore not disturb the air flow past the nacelle. The service crane may thus be permanently installed inside the nacelle.

The service crane may be mounted at a central position inside the nacelle, e.g. in the middle between the two sides of the nacelle.

In an embodiment, the service crane is a telescopic crane, the boom of the service crane being a telescopic boom that is extendable from a retracted position to an extended position. The crane may for example be adapted so that in the retracted position, a lifting of a load to different positions inside the nacelle and inside the tower is possible, while in an extended position, the boom of the crane may reach to the outside of the nacelle. Furthermore, by varying the length of the boom, different locations inside the nacelle may be reached, different positions on a helihoist platform and different positions outside the tower of the wind turbine may be reached. The telescopic boom may for example comprise telescopic members that are slidingly engaged. They may be extendable by means of a push cylinder, e.g. one or more hydraulic push cylinders.

The telescopic boom may comprise a telescopic base member that is pivotably mounted to a base body of the service crane so as to be pivotable around a pivot point. The telescopic base member may comprise in its longitudinal direction a first end at which the boom is extendable, wherein at its end opposite in longitudinal direction to the first end, the telescopic base member may extend beyond the pivot point. Such configuration may enable the service crane to reach different positions inside the nacelle, and to enable the lifting of loads from inside the tower, as the boom may be pivoted into an upward direction without requiring an excessive clearance above the service crane. As the base member of the boom may extend beyond the pivot point, the telescopic members of the boom may still have a considerable length, so that the boom is extendable to a relatively large distance outside the nacelle.

The telescopic base member may for example extend at least 10% of its total length beyond the pivot point, or may extend at least 15 or even at least 20% of its length beyond the pivot point. It may for example extend between 10 and 40% of its total length beyond the pivot point.

In an embodiment, the winch may be mounted on an upper side of the boom. Such configuration may make the service crane more compact.

The winch may be mounted to the boom at a position in longitudinal direction of the boom that is adjacent to the longitudinal position of the pivot point. The winch may be mounted on a side of the boom that is in lateral direction of the boom opposite to the side of the boom at which the pivot point is located. Movement of the winch may thus be kept small when the boom is pivoted around the pivot point. The winch may be mounted above the pivot point.

The service crane may be a hydraulic crane. The service crane may thus have a compact size while still enabling the lifting of relatively heavy loads.

In a further embodiment, a nacelle of a wind turbine is provided which comprises a service crane in accordance with one or a combination of the above mentioned embodiments. The service crane is mounted inside the nacelle.

Such configuration of the nacelle may facilitate the servicing of components of the nacelle, as equipment, such as tools or spare parts, may be lifted to the inside of the nacelle even in bad weather conditions. By means of the nacelle, features similar to those outlined further above may be achieved.

In an embodiment, the nacelle comprises a canopy, the canopy being provided with at least one hatch that is adapted and/or arranged so as to enable the service crane to reach out through the hatch and to lift a load from a position adjacent to a base of the tower of the wind turbine and/or from a helihoist platform mounted to the nacelle. Equipment that is disposed at different positions may thus be lifted to the inside of the nacelle with a single service crane.

The nacelle may comprise at least a first hatch arranged in the top of the nacelle and a second hatch arranged in the side or area of the nacelle so as to enable the service crane to reach out through the first hatch to lift a load from the helihoist platform mounted to the nacelle and to reach out through the second hatch to lift a load from a position adjacent to a base of the tower of the wind turbine. The service crane may thus perform lifting operations from three different positions, in particular from the base of the tower, from the helihoist platform and from the inside of the tower. This may avoid the need to provide further service cranes and to perform several different lifting operations in order to position a load inside the nacelle. In particular, as the service crane may be arranged to position the load at a desired location inside the nacelle, and as the service crane is mounted inside the nacelle, lifting operations inside the nacelle may also be performed by the service crane. The boom of the service crane may enable the service crane to reach different positions inside the nacelle.

The nacelle may comprise a bed frame. The bed frame may be adapted to carry a generator assembly of the wind turbine.

The bed frame may further be adapted to provide access to the inside of the tower of the wind turbine for the service crane. Configuring the nacelle in such a way enables a simplified access to the inside of the tower of the wind turbine. The service crane may be mounted to the bed frame. A stable support may thus be provided for the service crane which enables the lifting of even heavier loads.

The bed frame may for example comprise an opening or a hatch which enables the access to the inside of the tower.

The wind turbine may be a direct drive wind turbine, and it may thus not comprise a gear box. This may grant an easy access to the inside of the tower, as it is not necessary to have a main shaft reaching from one side of the nacelle to the other side of the nacelle over the position at which the top of the tower meets the nacelle.

The features of the aspects and embodiments of the invention described above and those yet to be explained further below may be combined with each other unless noted to the contrary.

BRIEF DESCRIPTION OF THE DRAWINGS

The foregoing and other features will become further apparent from the following detailed description read in conjunction with the accompanying drawings. In the drawings, like reference numerals refer to like elements.

DETAILED DESCRIPTION

In the following, the embodiments illustrated in the accompanying drawings are described in more detail. It is to be understood that the following description is only illustrative and non restrictive. The drawings are only schematic representations, and the elements in the drawings are not necessarily to scale with each other. Furthermore, the drawings only show a limited number of components, or parts of components, and it is to be understood that further components which are not shown in the drawings may be present.

Figure 1:
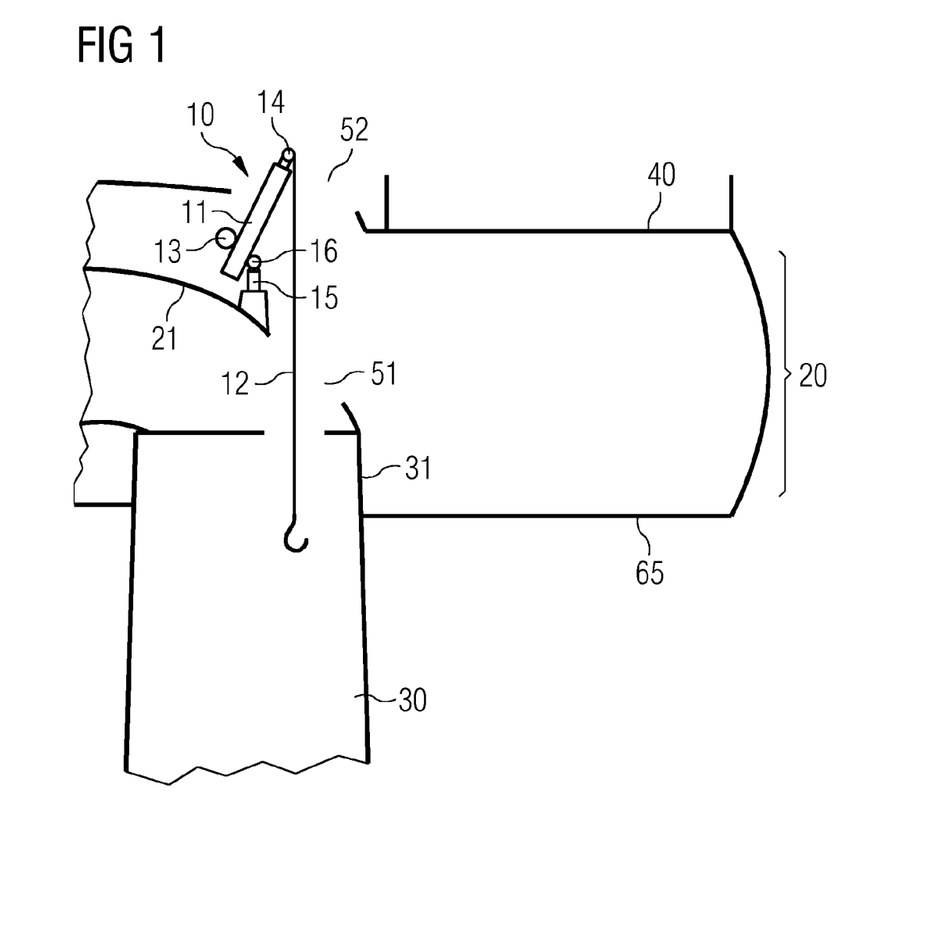
FIG. 1 shows a schematic sectional side view of a wind turbine including a service crane according to an embodiment.

FIG. 1 shows a sectional side view of the upper part of the wind turbine including a nacelle 20 mounted to the top of tower 30 of the wind turbine. At the top 31 of tower 30, a bed frame 21 is provided which supports the nacelle 20. The bed frame 21 may for example comprise iron/steel piping and plates. Bed frame 21 together with nacelle 20 may be rotated relative to tower 30 by means of a yaw drive (not shown).

Note that the front part of nacelle 20 towards which the hub and roller plates are mounted is not shown. Nacelle 20 may comprise a helihoist platform 40 towards which loads may be lowered from a helicopter.

FIG. 1 further illustrates a service crane 10 according to an embodiment of the invention. Service crane 10 is mounted inside the nacelle 20. In the example of FIG. 1, service crane 10 is mounted to the bed frame 21. Service crane 10 comprises a base body 15 which may for example include a mounting column that is rotatable and thus allows a rotation of service crane 10 around a vertical rotation axis. Service crane 10 further comprises a pivotable boom 11 that is pivotably mounted to the base body 15. Boom 10 may thus be pivoted around a horizontal axis running through pivot point 16. Boom 11 of crane 10 may thus be rotated and pivoted to different positions.

Service crane 10 further comprises a winch 13 that is capable of reeling in and reeling out a hoist rope 12. The hoist rope 12 is guided along the crane boom 11. An upper sheave 14 (or deflection roller) is provided at the tip of boom 11. The hoist rope 12 runs over the upper sheave 14 from which it is hanging down. The position at which a load may be taken up by hoist rope 12 may thus be determined by adjusting the position of the boom 11 of service crane 10.

Figure 3:
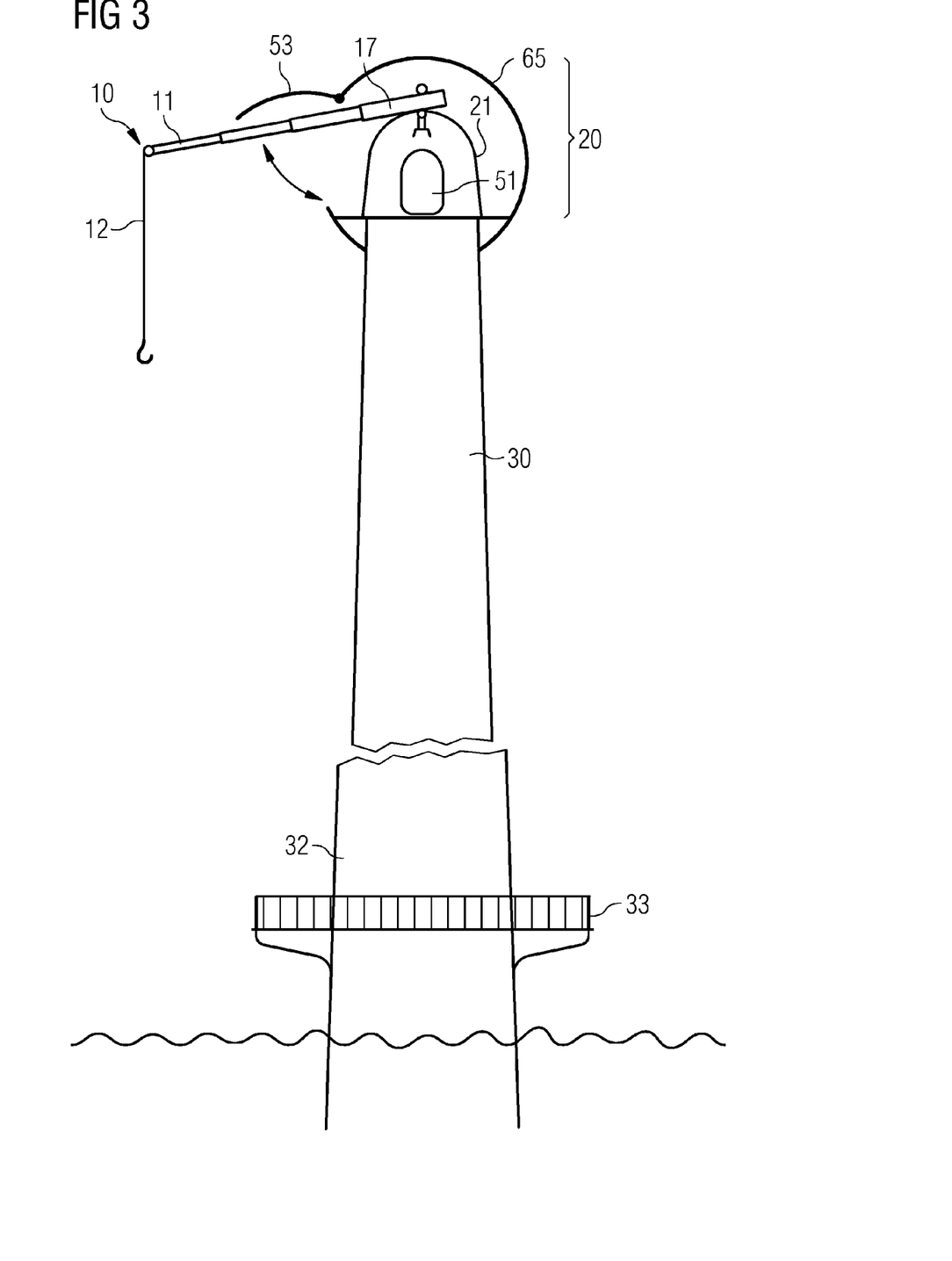
FIG. 3 shows a schematic sectional rear view of the wind turbine including the service crane according to the embodiment illustrated in FIG. 1.
Figure 4:
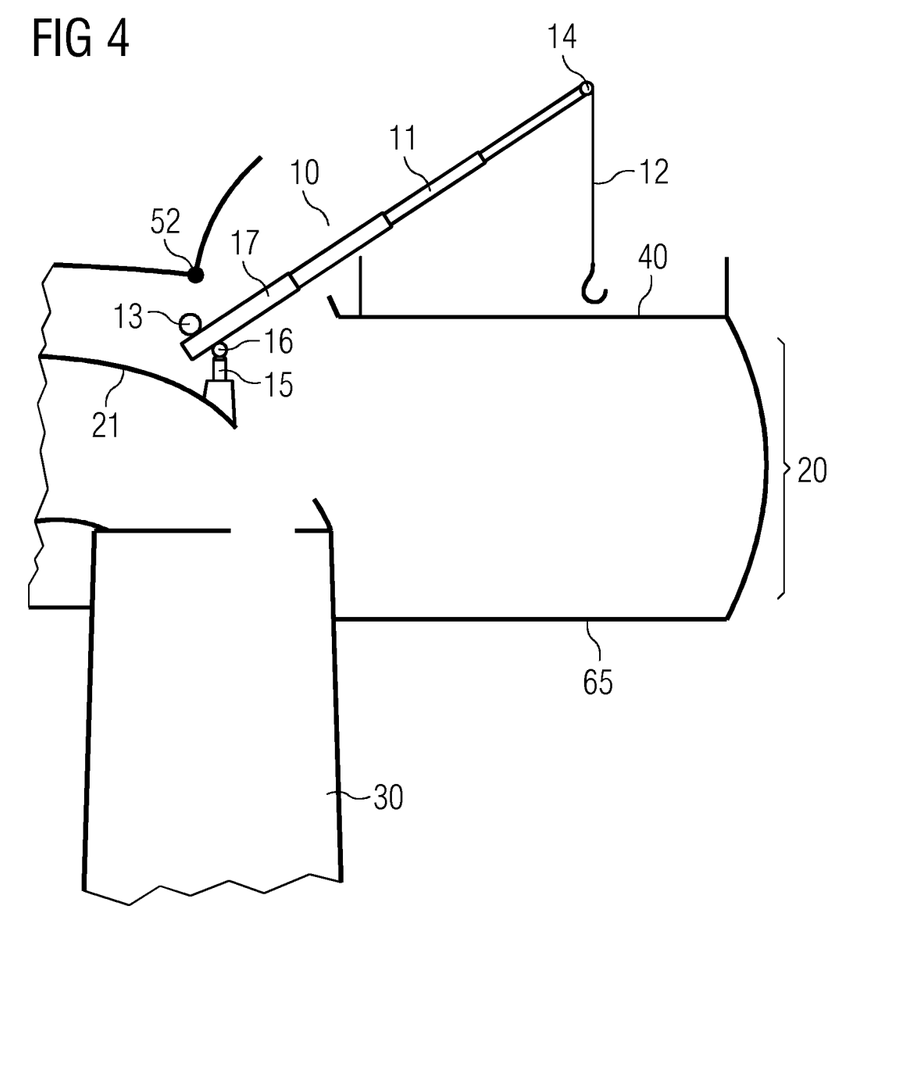
FIG. 4 is a schematic sectional side view of the wind turbine including the service crane according to the embodiment illustrated in FIG. 1, wherein the service crane is extended over a helihoist platform.

Service crane 10 is further a telescopic service crane, the boom 11 of which may be extended telescopically, which is illustrated in FIGS. 3 and 4 and will be described in more detail with respect to these. Accordingly, service crane 10 is capable of reaching a plurality of different positions within nacelle 20.

Furthermore, service crane 10 is arranged within the nacelle 20 and configured in such a way that it is capable of reaching down into the tower 30 of the wind turbine, as illustrated in FIG. 1. In the example of FIG. 1, service crane 10 is arranged above an opening 51 in the bed frame 21. Hoist rope 12 may thus be lowered through opening 51 and through further openings in the bottom of the nacelle or the top of the tower to the inside of the tower 30. Service crane 10 is thus capable of lifting a load from a platform at a certain level of tower 30, or from the base of the tower 30. In the example of FIG. 1, the telescopic boom 11 is configured such that in its retracted position, it may reach over the opening 51, e.g. by pivoting boom 11 around pivot point 16 in order to raise the upper sheave 14 above opening 51.

In the configuration of FIG. 1, an opening 52 is provided in the canopy 65 of nacelle 20, through which boom 11 extends in the upright position when lifting a load from inside tower 30. The opening 52 may be provided by means of a hatch which is for example illustrated in FIG. 2. The hatch 52 may thus be opened before lifting a load from inside tower 30, so as to prevent the boom 11 of the service crane 10 to touch the canopy 65. In other configurations, service crane 10 may be arranged and/or configured such that a lifting from inside tower 30 becomes possible without the need to open a hatch in canopy 65.

Figure 2:
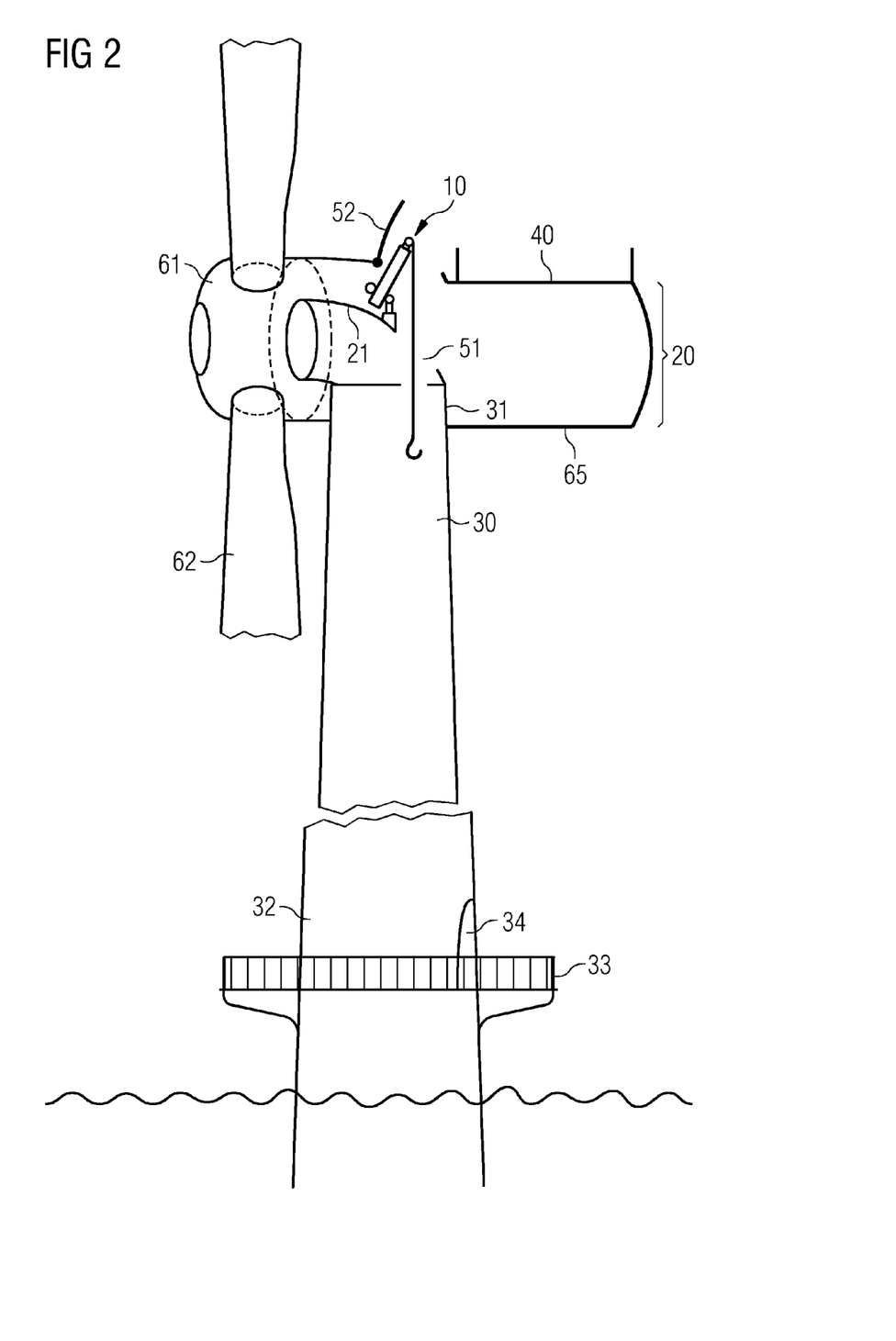
FIG. 2 is a schematic sectional side view illustrating a larger section of the wind turbine of FIG. 1 including the service crane.

A larger section of the wind turbine of FIG. 1 is illustrated in FIG. 2. FIG. 2 shows the hub 61 mounted to the front of nacelle 20 and furthermore sections of rotor blades 62 mounted to the hub 61. The wind turbine is a direct drive wind turbine in which the hub 61 is coupled to a rotor of a generator without a gear box, the generator being supported by the bed frame 21.

As may be seen in FIG. 2, the service crane 10 is capable of lifting a load from the base 32 of the tower 30, e.g. from a base platform 33. Note that while FIG. 2 illustrates an offshore wind turbine installed at sea, the wind turbine may certainly also be a land based wind turbine that is installed in the ground.

A vessel may for example be used to transport equipment, such as spare parts or tools to the wind turbine, the equipment being unloaded on a base platform 33 and by means of an access door 34 positioned inside the tower 30 of the wind turbine. When required, the spare parts may then be lifted by means of service crane 10 from the base of the tower 30 into the nacelle 20, e.g. when repairs or a service needs to be performed.

As the hoist rope 12 of service crane 10 is not exposed to the outside weather conditions during the lift, in particular to the strong wind that may flow around tower 30 of the wind turbine, a swinging of the load and the hoist rope 12 may be prevented. Thus, if a wind turbine component in the nacelle 20 should fail, a repair may be performed even in bad weather conditions, as the service technicians may work inside the nacelle 20 and the required spare parts and tools may be lifted by service crane 10 from the base of the tower 30 and may furthermore be positioned at the desired location within nacelle 20. Service crane 10 may for example be configured so as to be capable of lifting a yaw drive motor or the like. It may be configured to lift loads up to 350 kg, up to 500 kg or even up to 1000 kg.

When service crane 10 is not required, e.g. during normal operation of the wind turbine, it may be moved to a position in which hatch 52 may be closed, so that service crane is completely comprised inside the canopy 65 of the nacelle 20. Service crane 10 is thus protected from the outside weather. As service crane 10 is permanently mounted to the nacelle 20, it is not necessary for service technicians to first install a service crane before starting to lift equipment.

FIG. 3 shows a rear sectional view of the wind turbine including the service crane 10 of FIGS. 1 and 2. In this illustration, the opening 51 in bed frame 21 may be observed. As illustrated, the canopy 65 of the nacelle 20 comprises a further hatch 53 on a side of the nacelle 20. Note that hatch 53 may also be provided on the other side of the nacelle 20, or in the rear of nacelle 20 or that plural of such hatch may be provided in combination. The service crane 10 is now arranged and/or adapted so that it may reach out through the hatch 53 and lift a load from a outside position adjacent to base 32 of the tower 30. Equipment may for example be unloaded onto base platform 33, service crane 10 being capable of lifting the load into nacelle 20. For this purpose, the service crane 10 may telescopically extend the boom 11, so that the tip of boom 11 reaches out beyond the base 32 of tower 30. The tower 30 may be a conical tower, so that the diameter of the tower 30 at its base 32 is larger then at its top 31. By means of the telescopic boom 11, service crane 10 is thus capable of lifting a load from platform 33 even in such configurations.

Again, the service crane 10 is capable of positioning the lifted load at a plurality of different locations within the nacelle 20, which may be achieved by retracting the telescopic boom 11 and by corresponding rotary or pivoting movements of service crane 10. Note that in other configurations, service crane 10 may reach out beyond platform 33 to lift a load directly form a vessel, or in the case of a land based wind turbine, service crane 10 may lift a load from the ground or from a vehicle positioned adjacent to base 32 of tower 30. Note that for reasons of a comprehensive presentation, the helihoist platform 40 is not shown in FIG. 3.

FIG. 4 shows a similar sectional side view as FIG. 1 of the wind turbine including the service crane 10. Service crane 10 is furthermore arranged and/or configured such that it is capable of reaching over the helihoist platform 40. FIG. 4 illustrates a situation in which the telescopic boom 11 of service crane 10 is extended through the open hatch 52 over the helihoist platform 40. The extension is such that the upper sheave 14 is positioned over helihoist platform 40 so that by means of hoist rope 12, a load disposed on the helihoist platform 40 may be taken up. Again, by retracting the telescopic boom 11, the load may be transported to the inside of nacelle 20 and the service crane is capable of positioning the load at a plurality of different positions inside the nacelle.

Hatch 52 is arranged on the upper side of the canopy 65. For different configurations of nacelle 20, e.g. for different positions of the helihoist platform 40, the position of service crane 10 or the position of hatch 52 may be adjusted so as to enable the service crane 10 to reach out over the helihoist platform 40.

As may be seen from FIGS. 3 and 4, the boom 11 of service crane 10 may extend a considerable length, so that the base of the tower 30 or the helihoist platform 40 may be reached. On the other hand, it is desirable that the service crane 10 is kept compact so that it is capable of reaching a plurality of different positions inside nacelle 20, for which it may need to be rotated and pivoted in the confided space of the nacelle 20. To achieve these contrary goals, the pivot point 16 around which the boom 11 is pivotable is not positioned at the end of the boom 11. The pivot point 16 is positioned at a lower part of the telescopic base member 17 of boom 11. Thus, in a retracted position, the radius of the arc that the upper sheave 14 describes when boom 11 is pivoted around pivot point 16 may be reduced. At the same time, the telescopic base member 17 and the further telescopic members that extend out of telescopic base member 17 may have a considerable length, as the telescopic base member 17 extends beyond the pivot point 16. Thus, the total extended length of boom 11 may be increased with the same number of telescopic members of the boom. Of the total length of the telescopic base member 17, between 10 and 40% may extend beyond the pivot point 16 (as seen from the tip of boom 11 at which the hoist rope 12 is guided and hanging down). The telescopic base member may for example extend at least 10%, at least 15% or even at least 20% of its total length beyond the pivot point 16.

As seen in the figures, winch 13 is mounted on top i.e. on an upper side of boom 11. Winch 13 and pivot point 16 are located on opposite sides of the boom 11. In other configurations, service crane 10 may be mounted over head, so that winch 13 is then located underneath boom 11. It should be clear that such different mounting positions, as well as others (e.g. a mounting position at a vertical element) are certainly conceivable. Positioning the winch 13 on the opposite side of pivot point 16 relative to boom 11 provides that the service crane 10 becomes more maneuverable. Winch 13 may for example be located centrally above the pivot point 16 when the boom 11 of service crane 10 is in a horizontal position, as illustrated in FIG. 3.

As outlined above, the service crane 10 may be mounted in a central position of the nacelle 20 from which it may hoist a load within the nacelle, through a hatch in the side or the rear of the nacelle up from the ground or a base platform, through a hatch in the upper side of the nacelle from the helihoist platform, and through an opening in the upper end of the tower 30 up from a level inside the tower. It should be clear that service crane 10 may certainly also lift a load from within the nacelle to the respective spot inside the tower, outside the base of the tower, or to the helihoist platform. The mounting position of the service crane 10 may be adjacent to the opening 51 in the bed frame 21. In particular, the mounting position may be located from the opening 51 in the direction towards the hub 61 of the wind turbine. The mounting position of service crane 10 may also be located in a direction towards the rear end of nacelle 20, or at a side of the opening 51, wherein the hatch 52 may be arranged correspondingly so as to enable the service crane 10 to reach out to the helihoist platform and to reach out through a hatch in the side of the nacelle. The service crane 10 may be mounted in the middle between the two side walls of nacelle 20, or it may be mounted on one side or the other of the nacelle.

In FIGS. 1 through 4, the service crane 10 is mounted to the bed frame 22 at a position located adjacent to an upper portion of the opening 51. This mounting position facilitates the service crane 10 to reach the different positions inside the nacelle, inside the tower 30 outside the nacelle and on the helihoist platform 40. In the embodiments illustrated above, only one crane is needed that may reach out into the different spots. If a load needs to be moved between the above places, no different cranes or hoist systems are needed. Furthermore, no temporary solutions are needed, like temporary external cranes mounted to the top or side of the nacelle or structures mounted to the outside of the nacelle or the tower. The service crane may be comprised completely inside the nacelle, i.e. inside the outer housing/canopy, it may for example be retracted into a non service position during normal operation of the wind turbine. Accordingly, the service crane is not exposed to weather conditions. In particular with direct drive wind turbines, the space inside the base 32 of the tower 30 may be empty, so that equipment may be placed there. From the free space in the bottom of the tower, the equipment may be lifted inside the tower up to the nacelle, the equipment and the hoist rope not being exposed to wind and weather conditions which may otherwise prevent the lifting operation, when lifting would be performed outside tower 30.

By means of embodiments of the service crane 10 and the nacelle 20 disclosed herein, servicing of the wind turbine is thus facilitated and down time of the wind turbine may be reduced, as the servicing may also be performed in bad weather conditions. Servicing also becomes more cost effective, as the use of external equipment may be avoided and as repairs inside the nacelle 20 may be performed even in bad weather conditions.

It should be clear that in the embodiments described above with respect to FIGS. 1 to 4, modifications are possible and not all features need to be provided. In some embodiments, the service crane 10 may for example only be capable of lifting loads inside tower 30. In other embodiments, the service crane 10 may only be capable of lifting loads from inside tower 30 and the helihoist platform 40, or from inside the tower 30 and from outside adjacent to base 32 of tower 30. Furthermore, the positioning of the service crane 10 is not limited to the mounting positioning illustrated in the FIGS. 1 to 4, but it may be positioned at any suitable location inside nacelle 20 that enables the service crane 10 to perform the lifting operations for which it is configured. The configuration of service crane 10 itself may also be different, winch 13 may for example be mounted at different positions on boom 11, or may be mounted to the base body 15 or the like. Similarly, the position on boom 11 at which boom 11 is mounted pivotably to the base body 15 may be different from the one illustrated and described above.

The invention claimed is:

1. A service crane for a wind turbine, the wind turbine comprising a tower and a nacelle mounted to the top of the tower, wherein the service crane is mounted to the nacelle and comprises:
   a boom;
   a hoist rope guided along the boom; and
   a winch that reels the hoist rope in and out in order to lift or lower a load,
   wherein the service crane is configured in order to lift a load from a position inside the tower of the wind turbine to the nacelle,
   wherein the nacelle comprises at least one hatch to the outside of the nacelle and wherein the service crane is configured such that the boom is capable of reaching through the at least one hatch to the outside of the nacelle so that the service crane is capable of lifting a load from a position adjacent to a base of the tower to the nacelle,
   wherein the nacelle further comprises a helihoist platform and a hatch at an upper side of the nacelle, and wherein the service crane is configured such that its boom is capable of reaching through the hatch at the upper side of the nacelle to the outside of the nacelle and over the helihoist platform so that the service crane is capable of lifting a load from the helihoist platform to the inside of the nacelle,
   wherein the service crane is mounted inside the nacelle, the service crane having a retracted position in which the service crane is completely comprised inside a canopy of the nacelle.

2. The service crane according to claim 1, wherein the service crane is mounted to a bed frame of the nacelle.

3. The service crane according to claim 1, wherein the service crane is a telescopic crane, the boom of the service crane being a telescopic boom that is extendible from a retracted position to an extended position.

4. A service crane for a wind turbine, the wind turbine comprising a tower and a nacelle mounted to the top of the tower, wherein the service crane is mounted to the nacelle and comprises:
   a boom;
   a hoist rope guided along the boom; and
   a winch that reels the hoist rope in and out in order to lift or lower a load,
   wherein the service crane is arranged in order to lift a load from a position inside the tower of the wind turbine to the nacelle,
   wherein the service crane is a telescopic crane, the boom of the service crane being a telescopic boom that is extendible from a retracted position to an extended position,
   wherein the telescopic boom comprises a telescopic base member that is pivotably mounted to a base body of the service crane so as to be pivotable around a pivot point,
   wherein the telescopic base member comprises in longitudinal direction a first end at which the boom is extendible, and
   wherein at its end opposite in longitudinal direction to said first end, the telescopic base member extends beyond said pivot point.

5. The service crane according to claim 4, wherein the service crane is reachable outside the nacelle to lift a load from a position adjacent to a base of the tower to the nacelle.

6. The service crane according to claim 4, wherein the boom reaches through a hatch of the nacelle to the outside of the nacelle.

7. The service crane according to claim 4, wherein the service crane is extendable outside the nacelle in order to lift a load from the helihoist platform of the nacelle to the inside of the nacelle.

8. The service crane according to claim 7, wherein the boom is reachable through a hatch at the upper side of the nacelle to the outside of the nacelle and over the helihoist platform.

9. The service crane according to claim 4, wherein the service crane is mounted inside the nacelle, the service crane includes a retracted position in which the service crane is completely comprised inside a canopy of the nacelle.

10. The service crane according to claim 4, wherein the winch is mounted on an upper side of the boom.

11. The service crane according to claim 4,
wherein the winch is mounted to the boom at a position in longitudinal direction of the boom that is adjacent to the longitudinal position of the pivot point.

12. The service crane according to claim 11,
wherein the winch is mounted on a side of the boom that is in lateral direction of the boom opposite to the side of the boom at which the pivot point is located.

13. A nacelle of a wind turbine comprising a service crane according to claim 4,
wherein the service crane being mounted inside the nacelle.

14. The nacelle according to claim 12, comprising:
a canopy including a hatch that is arranged to enable the service crane to reach out through the hatch and to lift a load from a position adjacent to a base of the tower of the wind turbine and/or from a helihoist platform mounted to the nacelle.

15. The nacelle according to claim 13,
wherein the nacelle comprises at least a first hatch arranged in the top of the nacelle and a second hatch arranged in the side or rear of the nacelle as to enable the service crane to reach out through the first hatch to lift a load from the helihoist platform mounted to the nacelle and to reach out through the second hatch to lift a load from a position adjacent to a base of the tower of the wind turbine.

16. The nacelle according to claim 12, comprising:
a bed frame arranged to carry a generator assembly of the wind turbine,
wherein the bed frame further arranged to provide access to the inside of the tower of the wind turbine for the service crane.

* * * * *